(12) United States Patent
Thompson

(10) Patent No.: US 7,809,919 B2
(45) Date of Patent: Oct. 5, 2010

(54) AUTOMATIC DATA BLOCK MISALIGNMENT DETECTION AND CORRECTION IN A COMPUTER SYSTEM UTILIZING A HARD DISK SUBSYSTEM

(75) Inventor: Mark J. Thompson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 540 days.

(21) Appl. No.: 11/493,154

(22) Filed: Jul. 26, 2006

(65) Prior Publication Data

US 2008/0028162 A1    Jan. 31, 2008

(51) Int. Cl.
 *G06F 12/00* (2006.01)
(52) U.S. Cl. .................. 711/201; 711/111; 711/112; 711/4; 711/170; 360/77.01; 360/77.04
(58) Field of Classification Search .......... None
See application file for complete search history.

(56) References Cited

U.S. PATENT DOCUMENTS

| | | | | |
|---|---|---|---|---|
| 5,537,534 A | * | 7/1996 | Voigt et al. | 714/6 |
| 5,748,855 A | * | 5/1998 | Levine et al. | 712/23 |
| 6,571,362 B1 | * | 5/2003 | Crater et al. | 714/701 |

* cited by examiner

*Primary Examiner*—Brian R Peugh
*Assistant Examiner*—Alan Otto

(57) ABSTRACT

An embodiment of a data misalignment correction method for a mass storage controller system that couples drives having large internal block sizes to a computer operating system having input/output data block requests, including automatically determining an amount of misalignment between a request of the input/output data block to the storage controller and the controller's current data alignment configuration and using the amount of misalignment to realign the mass storage controller system configuration to match the operating system's input/output requests for optimizing input/output performance with the attached drives.

20 Claims, 11 Drawing Sheets

| MISALIGNMENT AMOUNT IN VIRTUAL DISK BLOCKS | NUMBER OF TIMES THIS MISALIGNMENT AMOUNT WAS OBSERVED |
|---|---|
| 0 | |
| 1 | |
| 2 | |
| 3 | |
| 4 | |
| 5 | |
| 6 | |
| 7 | |
| ... | |
| Etc | |

| MISALIGNMENT AMOUNT IN VIRTUAL DISK BLOCKS | NUMBER OF TIMES THIS MISALIGNMENT AMOUNT WAS OBSERVED |
|---|---|
| 0 | |
| 1 | |
| 2 | |
| 3 | |
| 4 | |
| 5 | |
| 6 | |
| 7 | |
| ... | |
| Etc | |

FIG. 5

AUTOMATIC DATA BLOCK MISALIGNMENT DETECTION AND CORRECTION IN A COMPUTER SYSTEM UTILIZING A HARD DISK SUBSYSTEM

BACKGROUND

Hard drive write requests smaller than a native internal block size of the hard disk, and larger write requests that are not aligned with the internal blocks of the hard disk, can cause the drive to perform an internal read-modify-write operation. This write request can cause an extra disk rotation to complete the operation, which can reduce performance. For example, this reduce performance write request could happen if the host operating system needed to write to a 512 byte block of data on the hard disk. Since the hard disk presents itself as having 512 bytes-per-sector, the host OS would assume the 512 bytes of data would be efficiently written to the hard disk in one write operation.

However, if the hard disk had an internal block size of 1 KB, then the smallest block of data that it could read or write would be 1 KB. In this example, the hard disk internally would have to first read the 1 KB block encompassing the destination of the 512 bytes into an internal memory buffer, then copy the 512 bytes into that buffer at the required offset, and finally write the entire 1 KB buffer back to the hard disk. This read-modify-write requirement is an inefficiency that drastically decreases the performance of the hard disk subsystem.

Also, most operating systems store data on storage media in larger than 512 byte block sizes, which add more complexities to this problem. For example the Microsoft Windows XP™ operating system commonly stores data in 4 KB or 16 KB blocks, starting at the beginning of the operating systems data area. The operating system data area may be offset from the beginning of a storage device due to "partitioning". Partitioning is the process of dividing the storage device into multiple areas (partitions), each area can then be utilized by different operating systems which may be installed. Also multiple partitions can be used by the same operating system in which case each would appear as a separate storage device accessible by the OS. The size and starting block of most read and write commands issued by the OS will be a multiple of this OS block size. It is noted that unnecessary additional block access can result in as much as a 50% performance loss.

As such, when OS data is stored on a drive, the OS is frequently oblivious to the fact that the drive's internal block size is larger that 512 bytes. The OS assumes that it is reading and writing to the hard disk in the most efficient way possible. However, in the case where the internal native block size of the drive is larger than 512 bytes, there are significant performance implications on whether the OS data blocks are "aligned" with the drives internal block size and their position.

SUMMARY

An embodiment of a data misalignment correction method for a mass storage controller system that couples drives having large internal block sizes to a computer operating system having input/output data block requests, including automatically determining an amount of misalignment between a request of the input/output data block to the storage controller and the controller's current data alignment configuration and using the amount of misalignment to realign the mass storage controller system configuration to match the operating system's input/output requests for optimizing input/output performance with the attached drives.

BRIEF DESCRIPTION OF THE DRAWINGS

FIG. 5 depicts a table of data that tracks statistical information related to host requests for one embodiment of the current invention.

DETAILED DESCRIPTION OF PREFERRED EMBODIMENT

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Since operating systems are free to choose their own data storage block sizes and hard drive manufacturers are free to choose their own internal hard drive blocks sizes, in one embodiment of the present invention, the alignment of the operating systems data storage blocks with the hard drive's internal data storage blocks is determined automatically and used to reconfigure the drive to the optimal alignment configuration. This reconfiguration has the result of decreasing the number of physical drive accesses required due to the most efficient alignment configuration being utilized by the hard drive subsystem.

Figure 1:
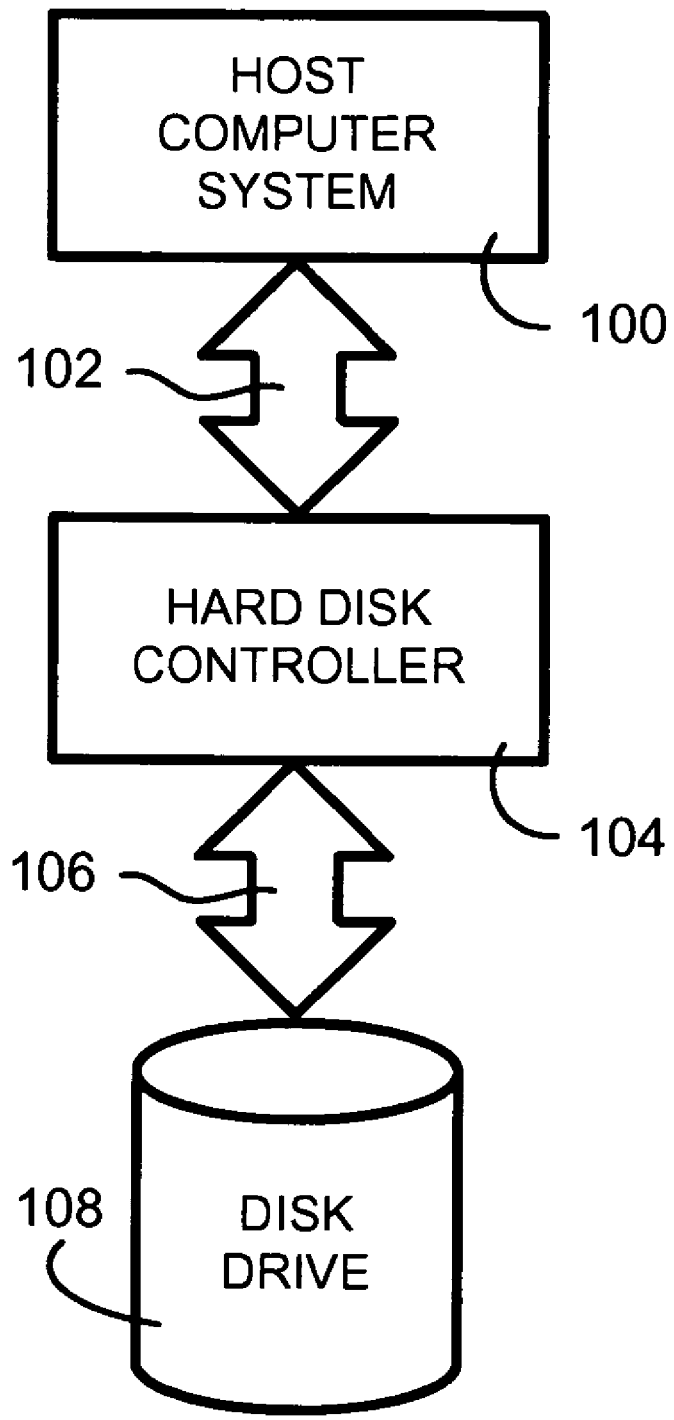
FIG. 1 is a block diagram of one embodiment of the invention, which is further detailed in FIGS. 2 through 8.

FIG. 1 is a block diagram illustrating a computer system incorporating one embodiment of the present invention. Shown in FIG. 1 is a host computer system 100 interfaced with a hard disk controller 104 with attached disk drive 108. An embodiment of the present invention relates specifically to hard disk controller 104, which can be a drive array access controller, made of hardware, software, or a combination of both. An embodiment of the present invention improves upon the functionality of existing hard drive controller systems.

Interface bus 102 is the communications channel by which the host computer system exchanges information with the hard disk controller and can be a Peripheral Component Interconnect (PCI), Industry Standard Architecture (ISA), Extended Industry Standard Architecture (EISA), Accelerated Graphics Port (AGP), Personal Computer Memory Card International Association (PCMCIA) bus, or others, and is assumed to be a PCI bus for this discussion. Hard disk controller 104 can implemented completely in software, integrated into the host computer system, or as an add on card such as IDE (Integrated Drive Electronics), EIDE (Enhanced IDE), SCSI (Small Computer System Interface), ATA (AT Attachment), FAST-ATA, SATA (Serial ATA), ESDI (Enhanced Small Device Interface) or others, and is assumed to be a SCSI card for this discussion As shown in FIG. 1, hard disk controller 104 has an additional interface bus 106, which is the communications channel it uses to communicate with hard disk drive 108. Interface bus 106 can be a Small Computer Systems Interface (SCSI), Advanced Technology Attachment (ATA), Enhanced Integrated Device Electronics (EIDE), Universal Serial Bus (USB), FireWire, Fiber Channel (FC), or others, and is assumed to be a SCSI bus for this discussion. Hard drive 108 is a mass storage drive which can be of the type hard drive, optical drive, CD drive, DVD drive, flash drive, tape drive and others, and is assumed to be a hard drive for this discussion.

It should be noted that the hard disk controller 104 is a bridge between the host computer system 100 and the disk drive 108 and the host computer system does not access disk drive 108 directly. In other words, the hard disk controller 104 hides the physical characteristics of the hard disk drive 108 from the host computer system and instead presents its own interface to the host computer system, thus presenting essentially a virtual drive to the OS. The hard disk controller may be a RAID controller. As far as the host computer system is concerned, the hard disk drive 108 is accessed only through the hard disk controller 104 and never directly accessed.

The ability of the hard drive controller 104 to hide the physical, internal characteristics of the hard disk drive 108 from the host computer system 100 is an abstraction that enables flexibility in the pairing of hard disk drives to operating systems. Many operating systems expect hard disk drives to have 512 bytes per sector, and without the abstraction created by the hard disk controller 104, communications between the two would be difficult.

Typically, the logic for this abstraction is contained in firmware which is executed by a microprocessor within the hard drive controller 104. It is this firmware that handles the communications with the host computer system 100 as well as the communications with the hard disk drive 108. Since the host operating system can possibly see the hard disk drive as having characteristics other that the drives true physical characteristics, one of the responsibilities of the firmware is to handle the mapping of operating system data requests into corresponding data request to the hard disk drive 108. For example, in response to an operating system request for a block of data, the hard disk controller firmware may need to make multiple requests to the drive array, possibly spanning across multiple physical disk blocks, and return the results back to the host computer system 100.

Figure 2:
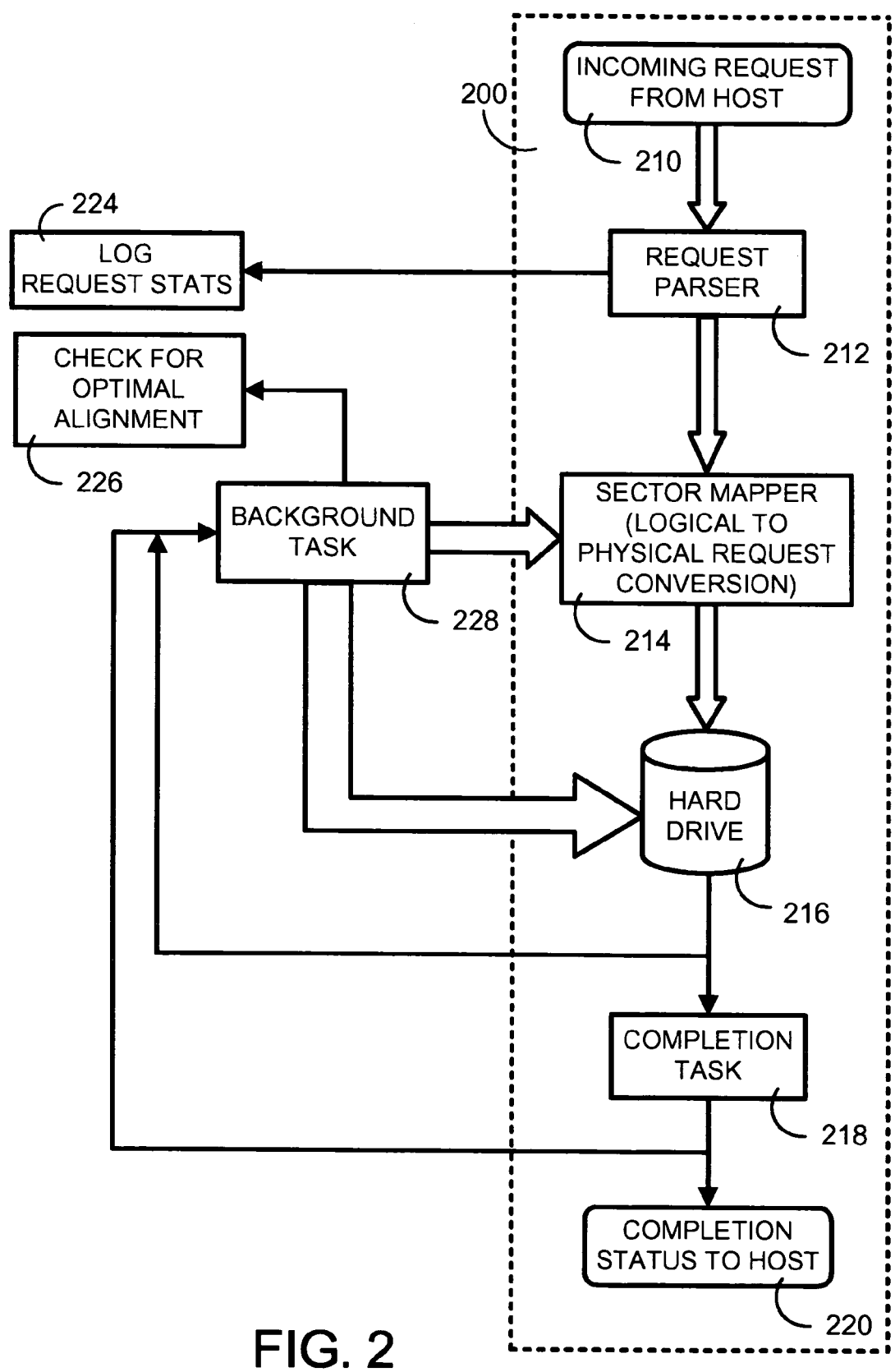
FIG. 2 is a block diagram representing the firmware tasks associated with one embodiment of the present invention, which is further detailed in FIGS. 6 and 7A and 7B.

FIG. 2 is a flow diagram representing the firmware of the hard disk controller of the present embodiment. The embodiments of the present invention can build upon existing established techniques used in typical hard disk controllers. Section 200 of FIG. 2 depicts a flow diagram with step-by-step logic of the firmware associated with the hard disk controller of one embodiment of the present invention that includes processing requests from the host. Incoming requests from the host (step 210) are received by the hard disk controller and submitted to the request parser (step 212). The request parser then passes the request on to the Sector Mapper (step 214).

The Sector Mapper in step 214 does a logical to physical request conversion and then generates and issues any command(s) to the physical disk drive (step 216). Upon completion of the command(s) issued to the physical disk drive (step 216), the status result is determined by the completion task module (step 218) and returned to the host (step 220). It is the efficiency of the processing of these requests from the host that the embodiments of the present invention addresses and improve upon.

An operating system typically stores and retrieves data from a storage device in the form of data blocks. Although 512 bytes are a common block size, it is common for operating systems to store data on storage media in larger OS-native block sizes. For example, the Microsoft Windows XP™ operating system commonly stores data in 4 KB or 16 KB blocks, starting at the beginning of the operating system data area. The size of most read or write commands issued by the OS is usually a multiple of the OS block size. The operating system data area may be offset from the beginning of a storage device due to partitioning information, which is normally stored at the beginning of the drive. The length of this partitioning information is independent of the OS block size.

Figure 3:
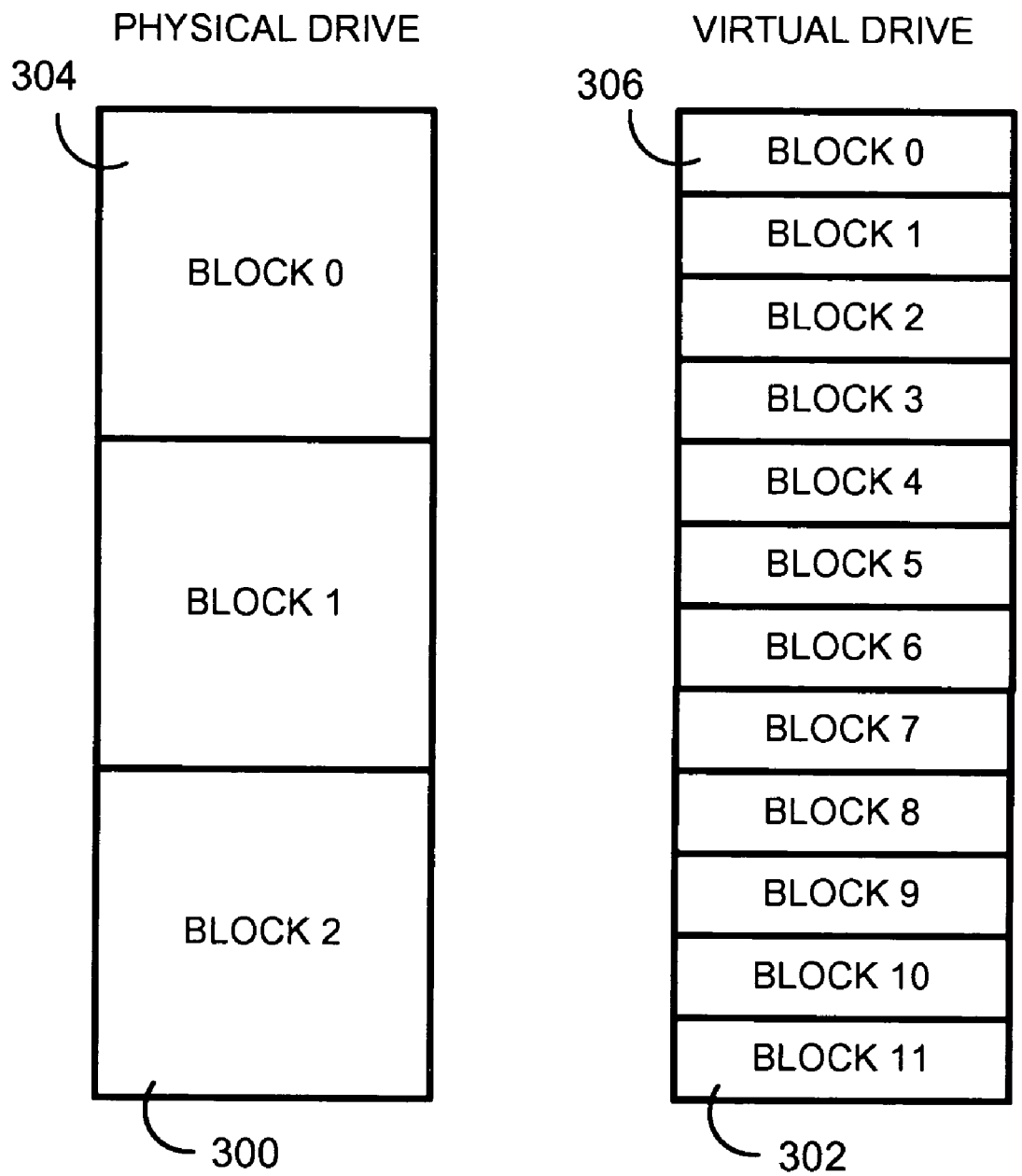
FIG. 3 depicts how a typical operating system arranges data blocks on a storage device.

Referring to FIG. 3, the physical organization of data of a hard disk drive versus the virtual organization of data, as seen by the operating system, is depicted. As shown in FIG. 3, data is stored physically on the disk drive 300 in large blocks 304. In this case, the drive 300 uses physical block sizes of 2 KB. In contrast, the data is stored on the virtual drive 302 in blocks 306, which are smaller than how the data is physically stored on the drive. For example, the virtual drive stores data in block sizes of 512 bytes, which is a standard block size for operating system and hard disk drives. Thus, for example, if the operating system were to request the data at block 6 from the hard disk drive, internally the hard drive would read physical block 1, extract the data which represents virtual block 6, which in this case would be the 512 bytes located at an offset of 1024 bytes into physical block 1, and return that data to the operating system.

When the host computer's operating system (OS) data is stored on a hard disk drive that uses its own internal block size, the OS is frequently oblivious to the fact that internally the hard disk is performing the necessary translations in order to handle the operating systems requests. However, there can be significant performance implications depending on whether the OS data blocks are aligned with the hard disk drive. For optimal storage system performance, data for small OS read or write requests (of the OS-native 4 KB or 16 KB block size) would span the minimal number of hard drive internal blocks. This is not always the case due to the fact that the OS does not know the hard disk drive internal configuration is different from the virtual drive that is presented to it. The OS usually assumes that the internal configuration of the hard drive is equal to the configuration presented to it by the hard drive. Misaligned data placement can occur where OS data blocks unnecessarily span multiple hard drive internal data blocks, thereby causing additional physical data blocks to be accessed.

Figure 4A:
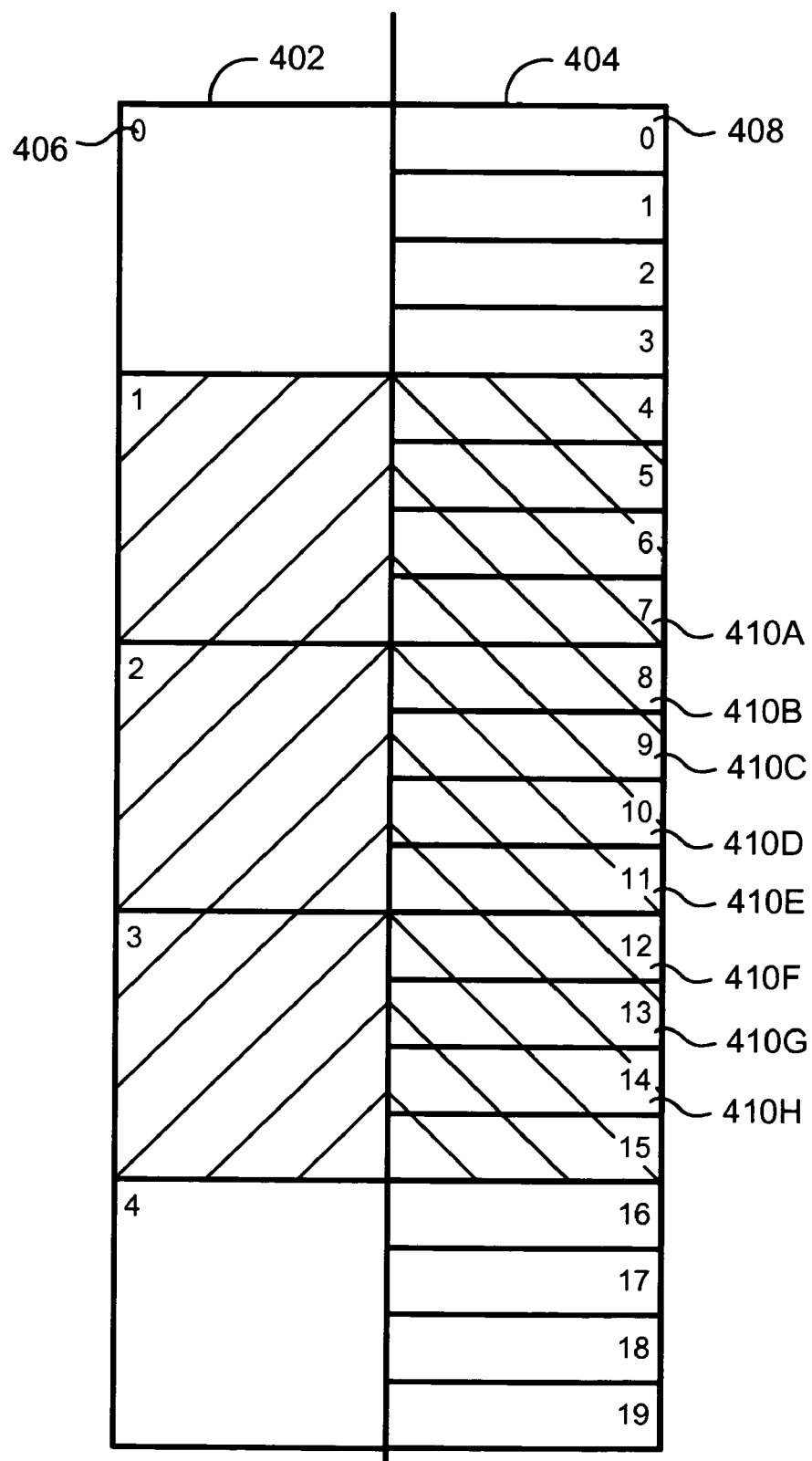
FIGS. 4A and 4B depict placement of the OS data on a logical drive, before and after the alignment adjustment process in one embodiment of the present invention.

FIG. 4A represents an example of a hard disk drive 400 before manipulation by one embodiment of the present invention. The hard disk drive 400 in FIG. 4A is depicted with its physical internal block layout 402 to the left of the separator, and its corresponding virtual block layout 404 to the right of the separator. Each cell in the left column 402 represents a data block as stored physically on the drive. The number in the upper left of each cell 406 represents its physical block number. Each cell in the right column 404 represents a virtual data block. The number in the upper right of each cell 408 represents the virtual block number as seen by the OS. In this example, the internal data block size of the hard drive is 2 KB, so physical block 0 consists of virtual blocks 0-3, physical block 1 consists of virtual blocks 4-7, etc. Referring to FIG. 4A, cells 410a-410h represent one OS data block, which is also the very first OS data block. Since this OS data block consists of 8 virtual blocks, the OS native block size is 8 times 512 bytes which is 4 KB. Also depicted in FIG. 4A is the fact that the OS data begins at virtual block 7 410a. This offset can be due to partitioning of the drive. Partitioning is the process of dividing up a hard drive into partitions, allowing multiple operating system data volumes to share the drive each using its own partition. The information stored in the virtual blocks 0-6 would contain the configuration information for the partitions.

It can be seen in FIG. 4A that when the OS needs to read the very first OS data block, which consists of the 8 virtual disk blocks 410a-410h, internally the disk drive must read physical blocks 1-3. In this example, the OS block size is 4 KB and the hard disk drive internal block size is 2 KB, so in an efficient configuration, this OS request should involve reading a maximum of 2 of the internal disk blocks. Since this one OS read request involves access to three physical disk blocks instead of two, it is an inefficient way to read data from the hard drive. Additionally, another inefficient method would be if the OS needed to write data to the same OS data block. In a write operation, some of the virtual blocks constitute only a subset of a physical disk block. For example, virtual block 7 410a is stored as 512 bytes located at an offset of 1536 bytes into physical block 1. In order to write virtual disk block 7 410a internally, the drive cannot simply write the 512 bytes of physical disk block 7 410a due to the fact that internally the drive is using physical disk blocks of 2 KB. Instead, internally the drive must read the entire physical block 1 into a 2 KB memory buffer, replace the 512 bytes of data at offset 1536 with the data to be written, and then write the modified 2 KB buffer back to physical block 1. This write process now involves a read operation as well, requiring at least two disk rotations instead of just one. This is an inefficient way of writing data to the drive. By adjusting the offset of the OS data, as shown in FIG. 4B, a more efficient data flow can be achieved.

Figure 4B:
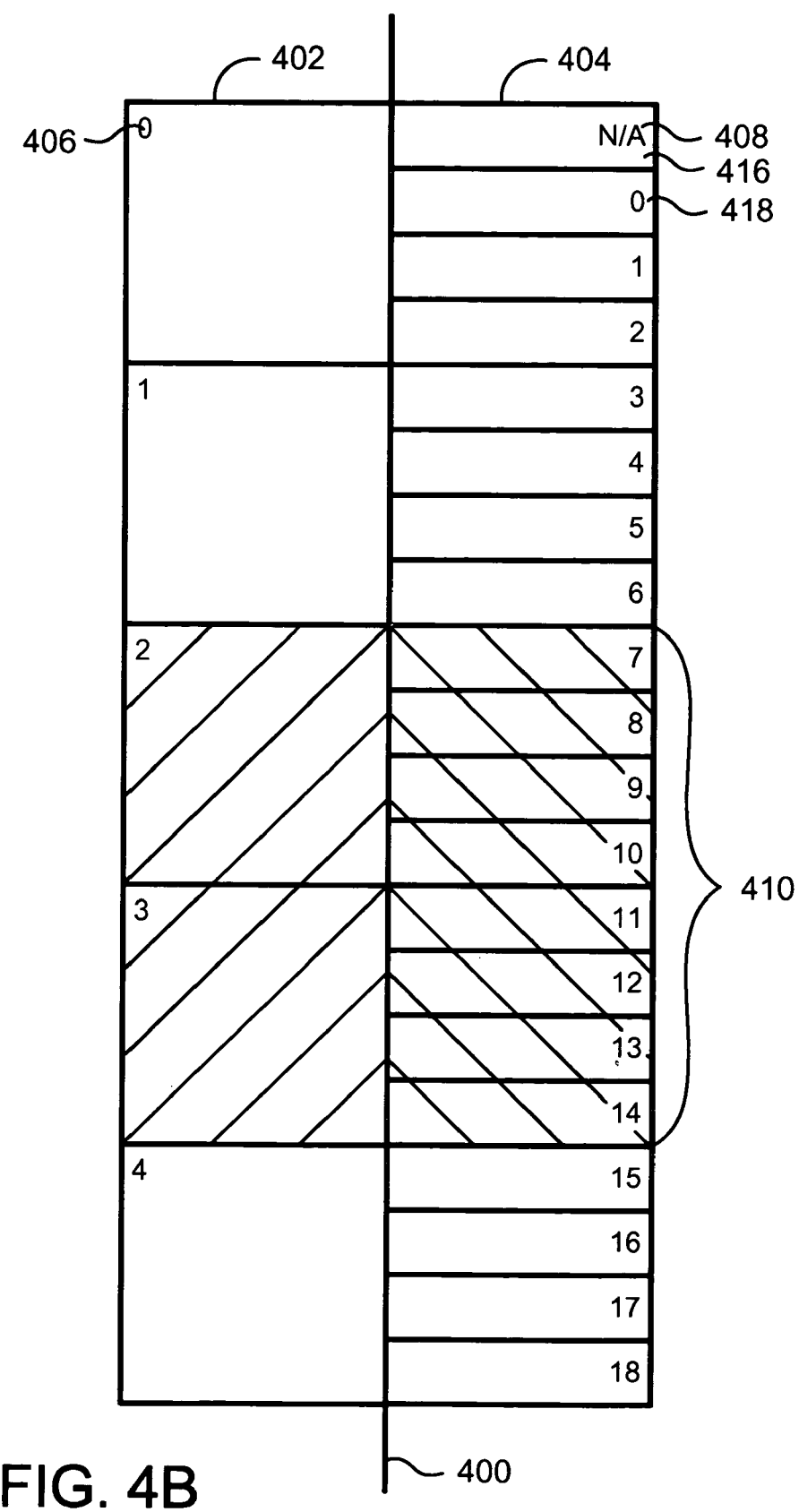

FIG. 4B represents the same hard disk drive as in FIG. 4A, but after a data realignment has occurred. The mapping of virtual block numbers to physical block numbers has been shifted up one virtual block by re-mapping the virtual blocks to begin at an offset of 512 bytes into physical block 0 of the hard disk drive 400 rather than that at the beginning of physical block 0. Now the beginning of virtual block 7 410a aligns exactly with the beginning of physical disk block 2. The result of shifting the virtual blocks is that now the start of the OS data, represented by cell 410a, aligns with the beginning of the second physical disk block. As FIG. 4B shows, the process of shifting the offset of the virtual disk blocks OS results in the first OS data block, represented by cells 410a-410h, fitting entirely within the two physical disk blocks 2 and 3. In this new configuration, when the first OS data block is requested, two physical disk blocks are accessed instead of three as in the previous configuration. This is a much more efficient data storage and retrieval configuration than was the case previous to the alignment and strip size adjustment.

Embodiments of the present invention increase efficiency by improving hard drive controller performance by 1) determining statistically the OS misalignment from incoming host requests, and 2) automatically adjusting the offset of the virtual disk blocks to compensate, without requiring a virtual-block-address to physical-block-address translation table.

In one embodiment of the invention, determining the misalignment is implemented as additional functions in the hard disk controller firmware. Referring back to FIG. 2, functions in steps 224, 226 and 228 are added. A request to the parser is made (step 212) upon each request from the host to call function to log request stats (step 224). To gather statistical data which will be used to determine the OS block misalignment, function to log request stats (step 224), updates a table in a portion of the firmware RAM. The number of requests made by the host computer system for a range of misalignment amounts can be tracked in a request table.

Referring to FIG. 5, table 500 is an array of counters 504 which in one embodiment of the present invention are implemented in Random Access Memory (RAM) accessible by the firmware. Column 506 in table 500 represents a count of misalignment amounts expressed in virtual disk blocks for I/O requests from the host, while column 508 in table 500 represents the number of times that particular misalignment amount was observed as the result of an I/O request made by the OS. Upon receiving the requests from the host, the counter for that particular misalignment amount is incremented.

In FIG. 5, table 500 is an array of counters 504 which in one embodiment of the present invention are implemented in Random Access Memory (RAM) accessible by the firmware. To gather statistical data which will be used to determine the block misalignment, function 224 of FIG. 2 updates a misalignment table in a portion of the firmware RAM. Referring to FIG. 5, table 500 represents a count of misalignment amounts expressed in physical disk blocks for I/O requests from the host. Determining the misalignment in one embodiment of the present invention is accomplished by ignoring very small requests, such as those smaller than the disk drive internal block size, and requests that are not a multiple of the disk drive internal block size. Of the remaining requests, the hard disk controller would then calculate the misalignment amount as the starting virtual block number of the host request modulo the (disk drive internal block size divided by the virtual block size). The counter corresponding to this misalignment amount is then incremented in table 602. The statistical data accumulated and stored in the request tables is constantly being evaluated by a background task, which can be implemented by the firmware.

Referring to FIG. 2, the check for optimal alignment step 226 is periodically called by the background task step 228. Using the data in table 500 of FIG. 5, the check for optimal alignment step 226 determines if the vast majority of host requests have the same misalignment amount. If this value can be determined, and is different from the current configuration, re-alignment can begin.

Alignment adjustment modifies the hard disk drive alignment such that the OS data will be more optimally aligned. In one embodiment of the present invention, a spare physical disk block would be reserved at the end of the hard drive and hidden from the OS. Upon approval from the system operator (or automatically if so enabled), all of the OS data would be relocated by a small adjustment amount (from 1 to disk drive internal block size divided by virtual block size minus 1 blocks, i.e. the misalignment amount determined above).

Figure 6:
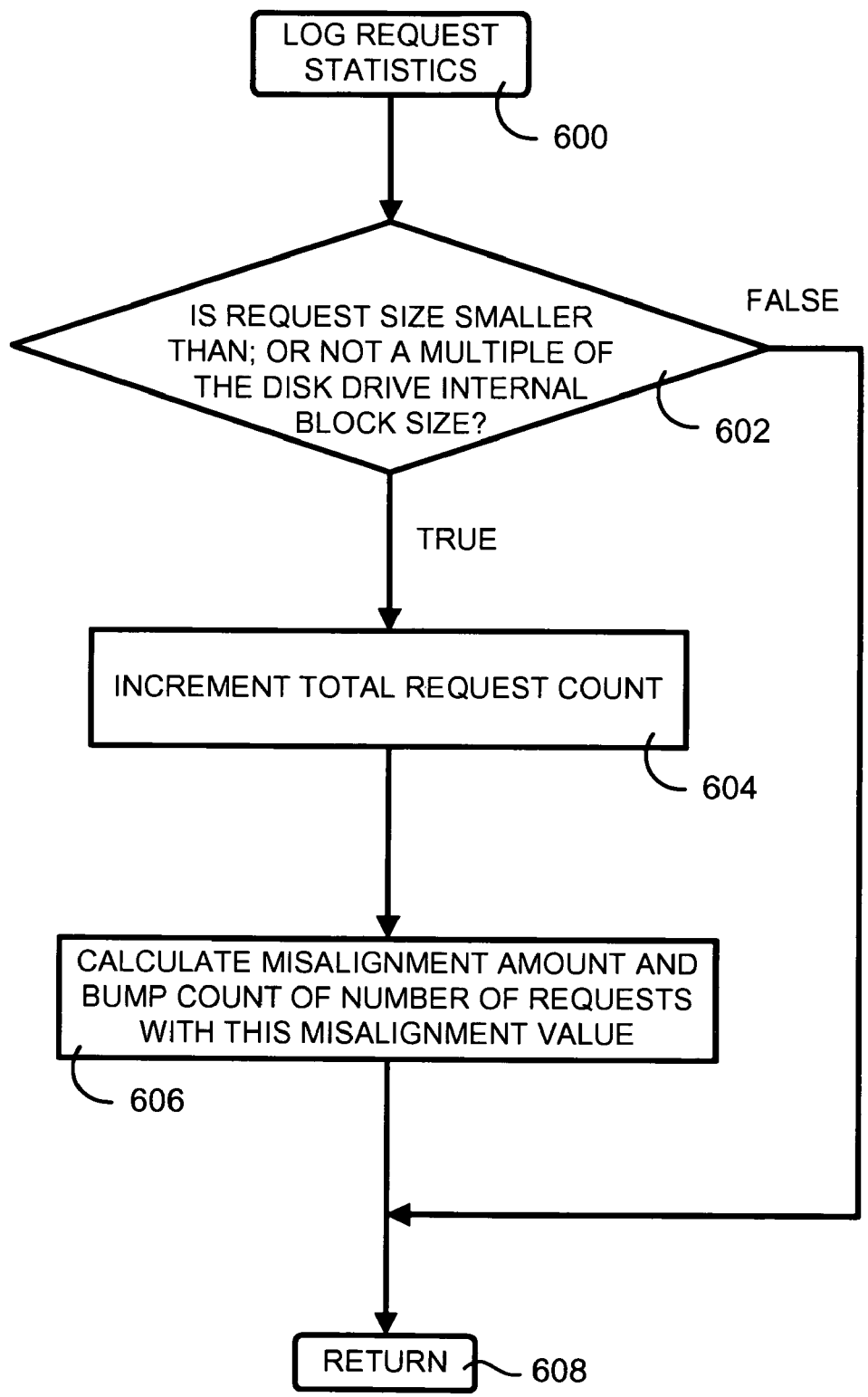
FIG. 6 is a flow chart of a software routine, which monitors and logs statistical information relating to operating system (OS) data requests in one embodiment of the present invention.

FIG. 6 is a flow diagram of the routine represented by the log request stats step 224 of FIG. 2. Log Request Statistics is called by the firmware with the host requested starting block number and size as its parameters (step 600). The requested size is compared against the disk drive internal block size (step 602), if the requested size is smaller than, or not a multiple of the disk drive internal block size, the routine returns with no further processing (step 614). Otherwise the total request count is incremented (step 604). Next the misalignment amount is calculated as the starting virtual block number of the host request modulo (the disk drive internal block size divided by the virtual block size), and the count of requests in table 500 with this misalignment is incremented (step 606). The routine then returns (step 608).

Figure 7A:
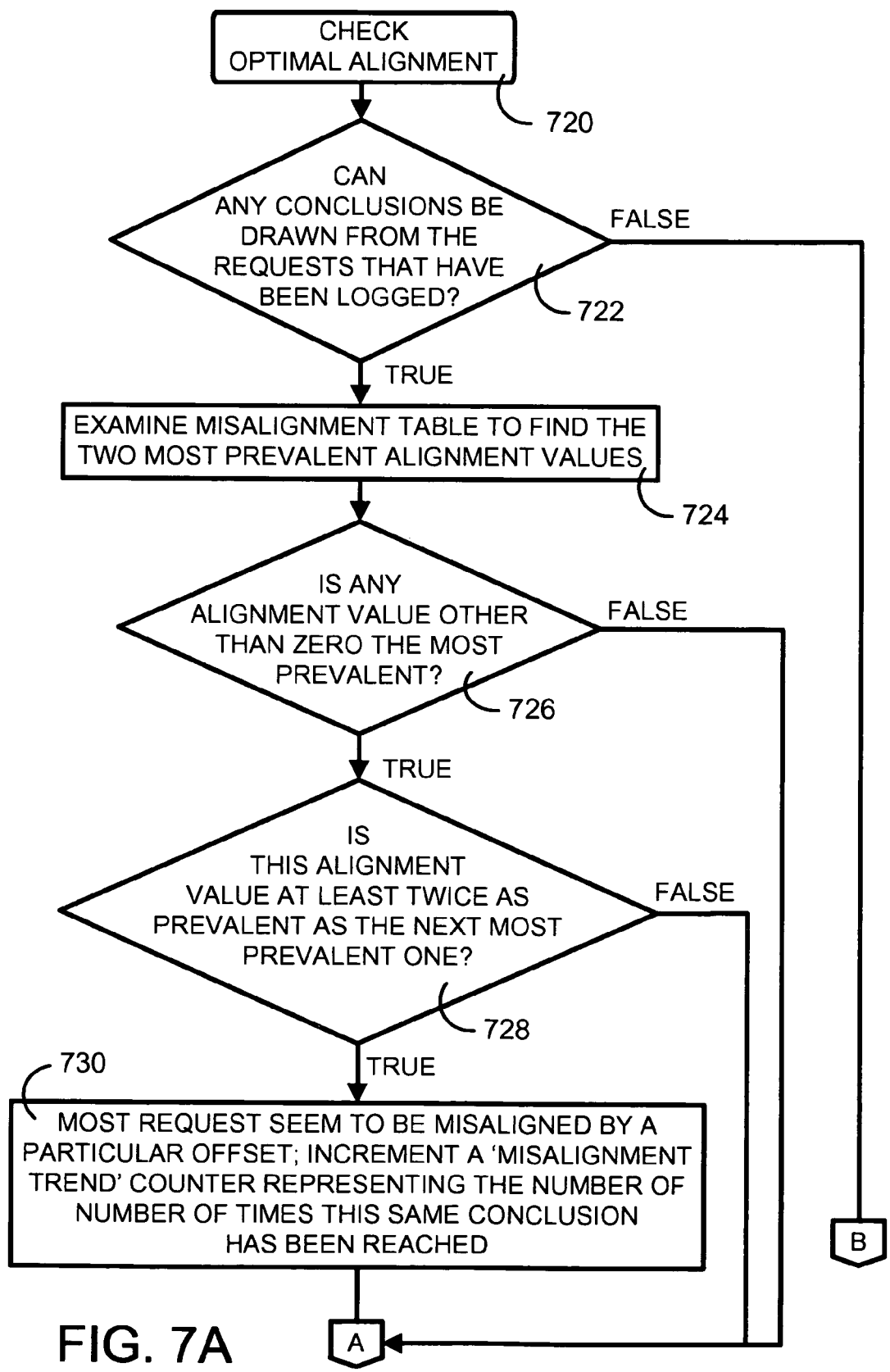
FIGS. 7A and 7B illustrate a flow chart of a routine, which analyzes logged statistical data in one embodiment of the present invention.

FIG. 7A is a flow diagram of the routine represented by the check for optimal alignment function of step 226 of FIG. 2. Check for optimal alignment function is called periodically by a background task running in the firmware of the hard disk controller (step 720). The check optimal alignment routine uses several configurable tuning parameters, which in one embodiment of the present invention are selectable via a configuration utility. This is most likely executed when the hard disk controller was configured i.e. at the same time it when installed in the computer system. Parameters would include values such as the minimum number of OS requests that must occur before a reconfiguration is initiated, the minimum ration of requests to a specific misalignment amount that would trigger a reconfiguration, and whether this automatic alignment process is enabled. Default values may be provided by the configuration program based on past performance analysis results.

Figure 7B:
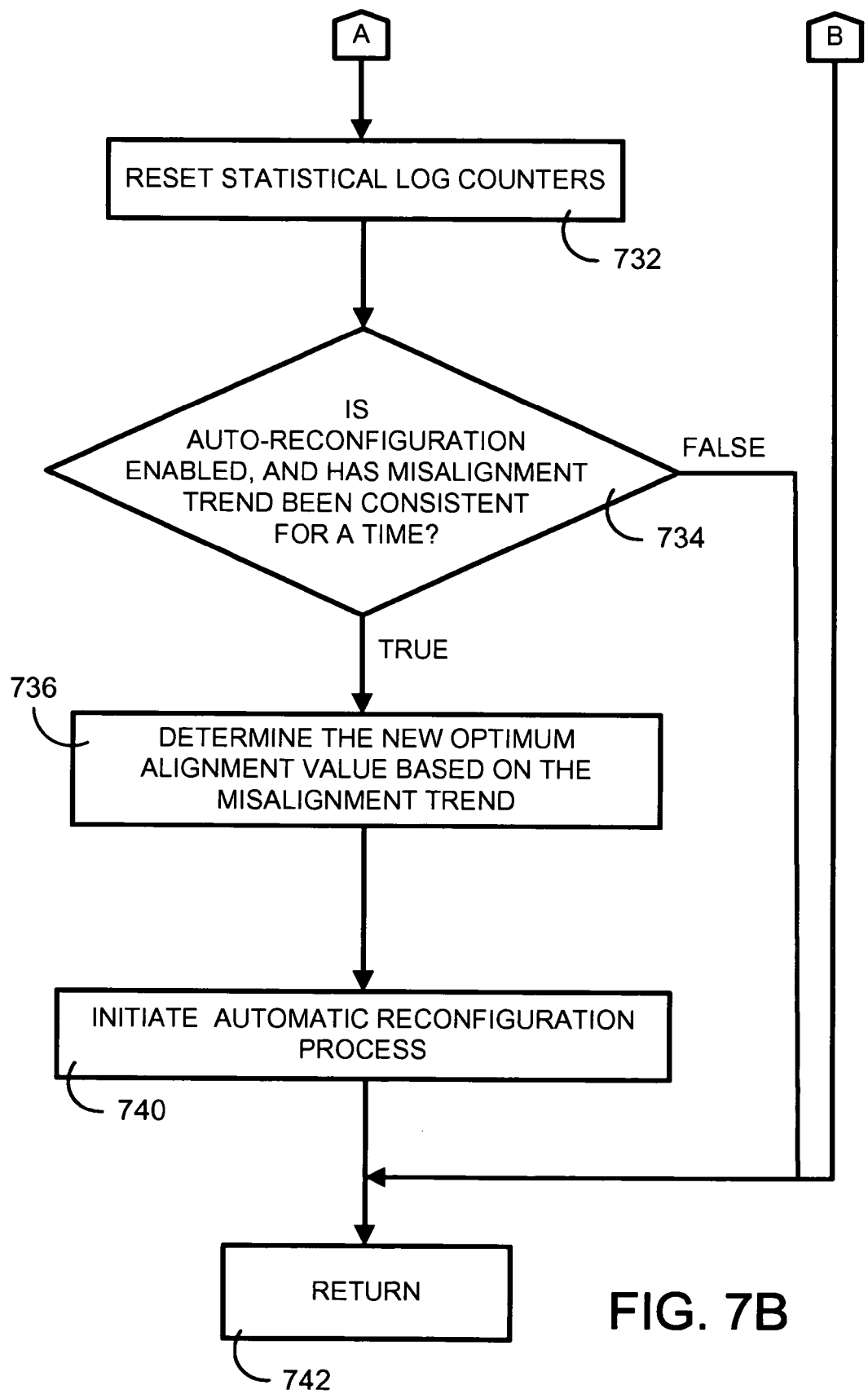

The number of requests logged (by the Log Statistics Routine) is then checked to see if there have been a predetermined threshold number of requests logged (one of the configurable tuning parameters) to draw any conclusions (step 722), if not the routine returns with no further processing (step 742 of FIG. 7B). If a predetermined number of threshold requests have been logged, the misalignment table is examined to find the two most prevalent values (step 724). The two alignment values are checked to see if any alignment value other than zero is the most prevalent (step 726), if not, the routine advances to (step 740). If any alignment value other that zero is most prevalent, the most prevalent alignment value is checked to see if it is at least twice as prevalent as the next most prevalent one (step 732). It should be noted that twice as prevalent is a configurable tuning parameter which could be set to other values, i.e. three times as prevalent or 1.5 times as prevalent. If more than zero alignment value is prevalent, then a misalignment trend counter, which in one embodiment of the present invention is implemented in Random Access Memory (RAM) accessible by the firmware and representing the number of times this conclusion has been reached, is incremented (step 730).

Referring now to FIG. 7B, the log counters for all of the data collected thus far, with the exception of the misalignment trend counter, are reset (step 732). Auto-reconfiguration is then checked to see if it's enabled and if the misalignment trend counter is larger than a predetermined threshold value (step 734). The threshold value would be determined by frequency at which the check optimal alignment 720 function gets called by the background task. If auto-reconfiguration is disabled, then the routine returns (step 742). If the misalignment trend count is above a predetermined threshold value, the system determines the new alignment value based on the misalignment trend (step 736). The automatic reconfiguration process is initiated (step 742) and the routine returns (step 742).

Figure 8:
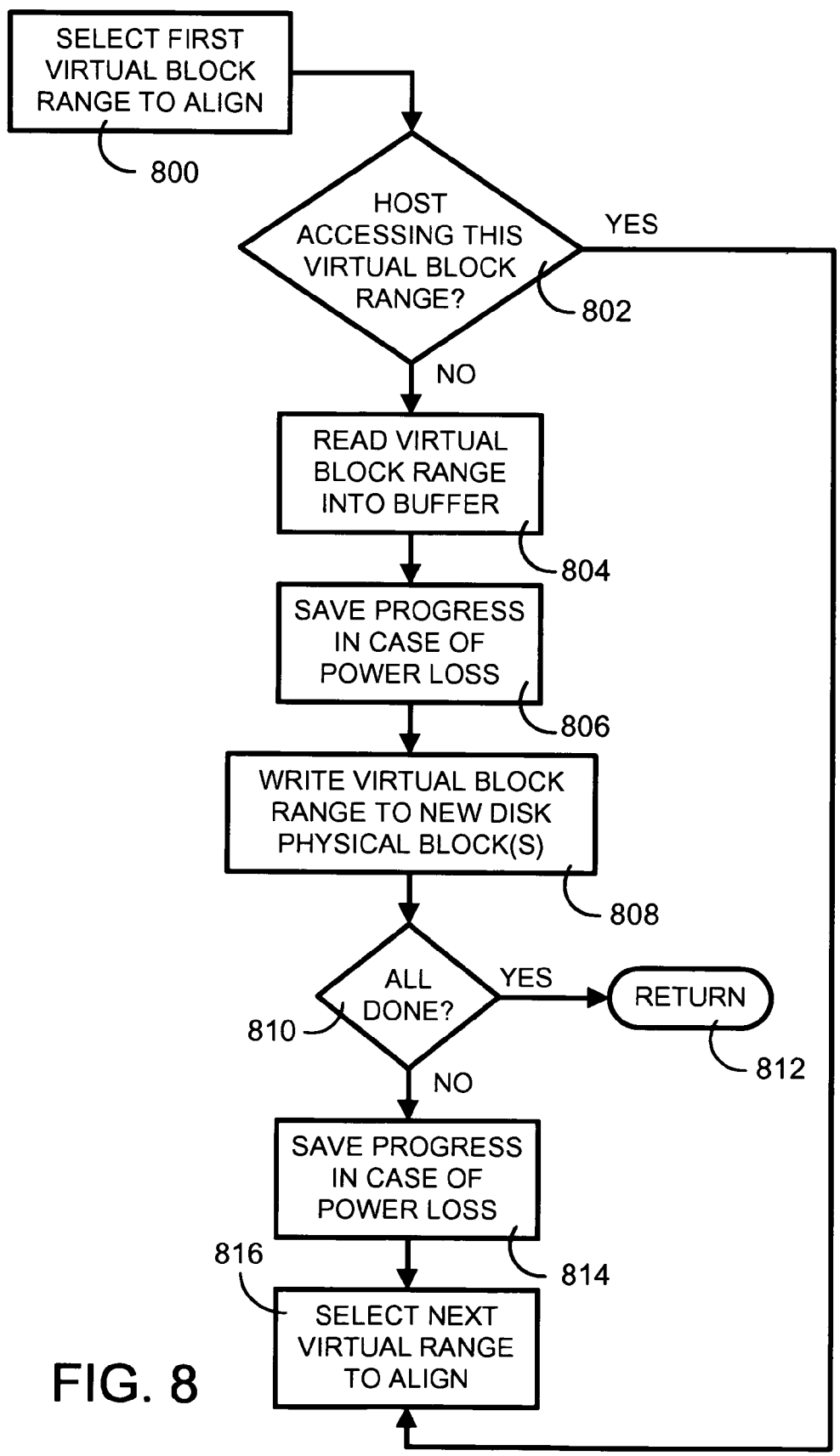
FIG. 8 is a flow chart of a software routine which performs the on-line RAID volume realignment procedure in one embodiment of the present invention.

FIG. 8 is a flow diagram representing the reconfiguration process implemented in firmware in an embodiment of the present invention, which is called to perform virtual block realignment. Referring to FIG. 8, the process begins by selecting the first virtual block range to process (step 800). The size of the block range to process is based on the size of a virtual block and the amount of memory and processing power available to the firmware. In addition, the order that the block ranges are copied (top down vs. bottom up) is chosen based on whether the new alignment adjustment is higher or lower than the previous alignment adjustment so that data that has yet to be aligned is not inadvertently overwritten. A table representing the virtual blocks currently being accessed by the host is checked against the virtual block range that is currently being realigned. This table, which in one embodiment of the present invention is implemented in Random Access Memory (RAM) accessible by the firmware, is updated upon each host request to reflect all virtual blocks which are currently being accessed by the host system. This checking continues until the virtual block range currently being realigned does not overlap the virtual blocks currently being accessed by the host (step 802).

The data from the virtual block range currently being realigned is then read into a buffer, which in one embodiment of the present invention is implemented in Random Access Memory (RAM) accessible by the firmware (step 804). The progress is stored in non-volatile memory in case of a power failure (step 806). In one embodiment of the present invention, both the data buffer RAM and the progress data are stored in non-volatile (battery-backed) RAM so that both data and progress are protected against power failure. Storing the progress made allows the reconfiguration to continue at the point where it left off in the case where power to the system is lost and the system needs to be restarted. Next the buffer containing the data just read is written to the new disk physical block(s) in its new and more optimally aligned format (step 808). If the virtual block range which has just been realigned is the last to require realignment (step 810), the reconfiguration process is complete and the process returns (step 812). If there are more virtual blocks left to realign, the progress made so far is again stored to non-volatile memory (step 814), the next virtual block range to realign is selected (step 816), and the realignment process continues (step 802).

Figure 9:
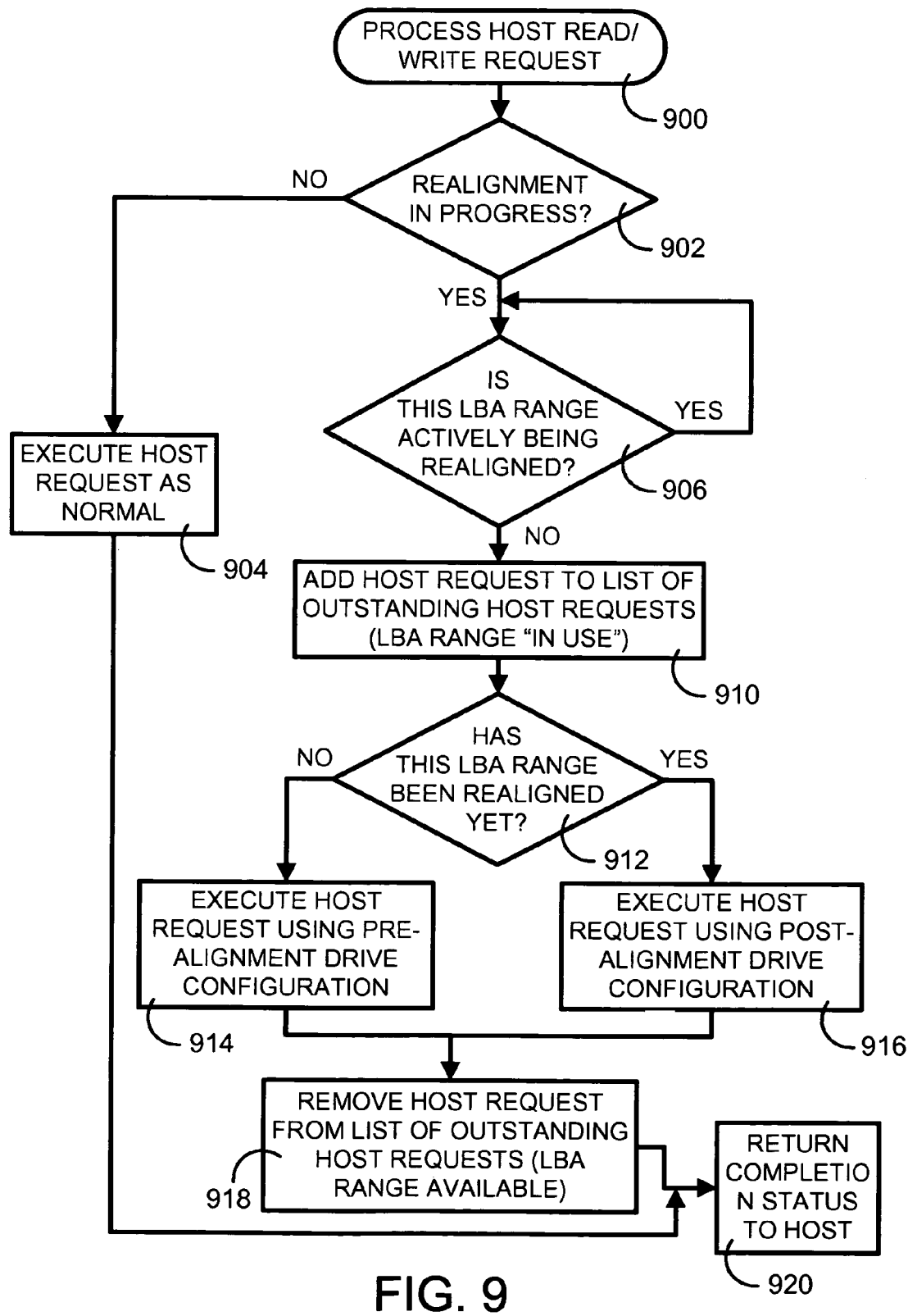
FIG. 9 is a flow chart of software routine that handles the processing of host read/write requests to the RAID volume while an on-line reconfiguration process is taking place, in one embodiment of the present invention.

Since the realignment process can be performed on-line, while the host operating system could be simultaneously running multiple independent software programs all requiring constant access to the mass storage drive array subsystem, access during the realignment process should be strictly coordinated to ensure that access to any virtual blocks currently being realigned does not result in invalid data being returned to the host. FIG. 9 is a flow diagram representing a function which handles read/write requests made by the host operating system, which in one embodiment of the present invention is implemented in firmware, and is called upon every read/write request made by the host operating system.

Referring to FIG. 9, a read/write request from the host is received (step 900). A check is done to see if a realignment is currently in progress (step 902), if a realignment is not currently in progress the host request is executed as normal, meaning the data is read or written as normal to the hard disk drive without any special handling, which would be required during a realignment, and the function returns a completion status to the host as normal (step 920). If realignment is currently in progress, the virtual block range which the host is currently attempting to access is checked against the virtual block range that is currently being realigned. This checking is continued until the virtual block ranges being accessed by the host don't overlap with the virtual block ranges currently being realigned by the background realignment process (step 906). At this point the virtual block range being requested by the host is added to a table which contains a list of all the virtual blocks which are currently being accessed by the host system. This table is accessed by the background realignment process to coordinate access to the hard disk drive and was described previously. Since the hard disk drive is currently in the process of realignment, a check is made to determine if the virtual blocks being accessed by the host have been realigned yet (step 912). If the virtual blocks have not been realigned yet, the host request is executed using pre-alignment drive configuration (step 914). If the virtual blocks have already been realigned, the host request is executed using post-alignment drive configuration (step 916). Next, the virtual block range which was requested by the host, and just processed, is removed from the table of virtual blocks being accessed by the host system (step 918), and a completion status is returned to the host (step 920).

Thus, the embodiments of the present invention solve the problem of performance loss in typical hard disk systems by determining statistically the OS block size and misalignment from incoming host requests, and automatically adjusting the alignment of the hard disk drive to compensate. The embodiments of the present invention accomplish the above without requiring a virtual-block-address to physical-block-address translation table.

The foregoing has described the principles, embodiments and modes of operation of the present invention. However, the embodiments of the present invention should not be construed as being limited to the particular embodiments discussed. The above-described embodiments should be regarded as illustrative rather than restrictive, and it should be appreciated that variations may be made in those embodiments by workers skilled in the art without departing from the scope of the embodiments of the present invention as defined by the following claims.

The invention claimed is:

1. A data misalignment correction method for a mass storage controller system that couples drives having internal block sizes to a computer operating system having input/output data block requests, comprising:

using a pre-programmed computer processor coupled to the operating system for automatically and statistically determining an amount of operating system misalignment between an incoming host request of the input/output data block to the storage controller and the controller's current data alignment configuration, wherein the operating system misalignment is determined based, at least in part, on a range of misalignment amounts tracked for a plurality of host requests;

using the pre-programmed processor to determine a misalignment trend, wherein if the misalignment trend is above a predetermined threshold value, using the pre-programmed processor to create a new alignment value based on the operating system misalignment; and electronically instructing an alignment device to use the new alignment value to realign the mass storage controller system configuration to match the operating system's input/output requests for optimizing input/output performance with the attached drives by automatically adjusting an offset of virtual disk blocks to compensate for the misalignment without requiring a virtual-block-address to physical-block-address translation table.

2. The method of claim 1, further comprising logging statistical information relating to the operating system's data requests.

3. The method of claim 2, using the logged statistical information for calculating a misalignment value.

4. The method of claim 1, further comprising determining whether the data requests are greater than or equal to the drives' internal block size.

5. The method of claim 4, further comprising using statistical analysis to determine misalignment if the data requests are greater than or equal to the drives' internal block size.

6. The method of claim 1, wherein automatically determining further comprises ignoring requests that are smaller than a predefined value.

7. The method of claim 1, further comprising using battery-backed random access memory (RAM) to protect against power loss during realignment.

8. The method of claim 1, wherein automatically determining comprises using an alignment table to find prevalent alignment values.

9. The method of claim 1, wherein the data misalignment correction method is incorporated in at least one of software, integrated into a host computer system, an expansion card, or firmware located in the mass storage controller.

10. A data misalignment correction device for a mass storage controller system, comprising:

input/output data block requests of a computer operating system coupled to the storage controller;

one or more drives with internal block sizes that are a multiple of the virtual block size presented to the computer operating system;

a misalignment detection device configured to automatically and statistically determine an amount of the operating system misalignment between an incoming host request of the input/output data block to the drives and the controller's current data alignment configuration, wherein the operating system misalignment is determined based, at least in part, on a range of misalignment amounts tracked for a plurality of host requests;

a misalignment trend device configured to determine a misalignment trend, wherein if the misalignment trend is above a predetermined threshold value, a new alignment value is created based on the operating system misalignment; and a realignment device configured to use the new alignment value to realign the storage controller's configuration to match the operating system's input/output requests for optimizing input/output performance by automatically adjusting an offset of virtual disk blocks to compensate for the misalignment without requiring a virtual-block-address to physical-block-address translation table.

11. The data misalignment correction device of claim 10, wherein the misalignment detection device is further configured to determine whether the data requests are greater than or equal to the drives' internal block size.

12. The data misalignment correction device of claim 10, wherein the misalignment detection device is configured to ignore requests that are smaller than the mass storage controller's drives' internal block size.

13. The data misalignment correction device of claim 10, wherein the misalignment detection device and the realignment device are incorporated in at least one of software, integrated into a host computer system, an expansion card or firmware located in the mass storage controller.

14. A data misalignment correction device, comprising:

means for automatically and statistically determining an amount of operating system misalignment of a computer system between an incoming host request of an input/output data block to a mass storage controller system and a current data alignment configuration of the mass storage controller, wherein the operating system misalignment is determined based, at least in part, on a range of misalignment amounts tracked for a plurality of host requests;

means for using a misalignment device to determine a misalignment trend, wherein if the misalignment trend is above a predetermined threshold value, a new alignment value is created based on the operating system misalignment; and means for using the new alignment value to realign the mass storage controller's configuration to match the operating system's input/output requests for optimizing input/output performance by automatically adjusting an offset of virtual disk blocks to compensate for the misalignment without requiring a virtual-block-address to physical-block-address translation table.

15. The data misalignment correction device of claim 14, further comprising means for using logged statistical information for calculating a misalignment value.

16. The data misalignment correction device of claim 14, further comprising means for ignoring requests that are smaller than a predefined value.

17. The data misalignment correction device of claim 14, wherein the misalignment detection device and the realignment device are incorporated in at least one of software, integrated into a host computer system, an expansion card or firmware located in the mass storage controller.

18. A misalignment correction method running on an operating system of a computer device, comprising:

using a pre-programmed computer processor for requesting input/output data blocks by the operating system coupled to a mass storage system;

using the pre-programmed computer processor for automatically and statistically determining an operating system misalignment value defining misalignment between an incoming host request of the input/output data block to the mass storage system and the storage controller's current data alignment configuration, wherein the operating system misalignment value is determined based, at least in part, on a range of misalignment amounts tracked for a plurality of host requests;

using the pre-programmed computer processor for electronically ignoring requests that are smaller than a predefined value;

using the pre-programmed computer processor for electronically logging statistical information relating to the operating system's data requests for calculating the operating system misalignment value;

using the pre-programmed processor to determine a misalignment trend, wherein if the misalignment trend is above a predetermined threshold value, the pre-programmed processor is used to create a new alignment value based on the operating system misalignment; and electronically instructing an alignment device to use the new alignment value to realign the mass storage controller's configuration to match the operating system's input/output requests for optimizing input/output performance by automatically adjusting an offset of virtual disk blocks to compensate for the misalignment without requiring a virtual-block-address to physical-block-address translation table.

19. The method of claim 18, further comprising using statistical analysis to determine misalignment if the data requests are greater than or equal to the disk drives' internal block size.

20. The method of claim 18, wherein the misalignment correction method is incorporated in at least one of software, integrated into a host computer system, an expansion card or firmware located in the mass storage system.

* * * * *